(12) United States Patent
Beeck et al.

(10) Patent No.: US 8,257,032 B2
(45) Date of Patent: Sep. 4, 2012

(54) GAS TURBINE WITH A GUIDE VANE

(75) Inventors: Alexander R. Beeck, Orlando, FL (US);
Katharina Bergander, Berlin (DE);
Georg Bostanjoglo, Berlin (DE); Tobias Buchal, Düsseldorf (DE); Winfried Eβer, Bochum (DE); Dirk Goldschmidt, Moers (DE); Torsten Koch, Oberhausen (DE); Rudolf Küperkoch, Essen (DE); Thorsten Mattheis, Mülheim (DE); Jan Münzer, Berlin (DE); Ralf Müsgen, Essen (DE); Matthias Oechsner, Mülheim an der Ruhr (DE); Ursula Pickert, Mülheim an der Ruhr (DE); Volker Vosberg, Mülheim an Ruhr (DE)

(73) Assignee: Siemens Aktiengesellschaft, München (DE)

( * ) Notice: Subject to any disclaimer, the term of this patent is extended or adjusted under 35 U.S.C. 154(b) by 1338 days.

(21) Appl. No.: 12/009,314

(22) Filed: Jan. 17, 2008

(65) Prior Publication Data

US 2008/0267771 A1    Oct. 30, 2008

(30) Foreign Application Priority Data

Jan. 18, 2007    (EP) .................................... 07001073

(51) Int. Cl.
*F04D 29/54*    (2006.01)
(52) U.S. Cl. ....................................... 415/191; 415/194

(58) Field of Classification Search .................. 415/191, 415/193, 194, 195, 209.1
See application file for complete search history.

(56) References Cited

U.S. PATENT DOCUMENTS

| | | | |
|---|---|---|---|
| 2,931,622 A * | 4/1960 | Klompas et al. ............... | 415/193 |
| 5,411,368 A * | 5/1995 | Chase et al. ................... | 415/189 |
| 6,602,047 B1 | 8/2003 | Barreto et al. | |
| 6,715,983 B2 * | 4/2004 | Koshoffer et al. ................ | 415/1 |
| 7,234,914 B2 * | 6/2007 | Usab et al. ........................ | 415/1 |
| 2003/0002979 A1 | 1/2003 | Koschier | |
| 2003/0059291 A1 | 3/2003 | Koshoffer et al. | |
| 2004/0101405 A1 | 5/2004 | Turner et al. | |

FOREIGN PATENT DOCUMENTS

| | | |
|---|---|---|
| EP | 1 298 286 A2 | 4/2003 |
| JP | 11190204 A | 7/1999 |
| JP | 2003148246 A | 5/2003 |
| JP | 2003278503 A | 10/2003 |
| JP | 2004176723 A | 6/2004 |
| WO | WO 2005/040559 A1 | 5/2005 |

* cited by examiner

*Primary Examiner* — Edward Look
*Assistant Examiner* — Andrew C Knopp

(57) ABSTRACT

A guide vane for a gas turbine with a vane base body which is of single-piece design and comprises a profiled vane blade extending between a vane root and a cover plate and also the vane root formed integrally with the vane blade and the cover plate formed integrally with the vane blade, is intended, in a relatively simple way to be able to be matched to the individual conditions of use with especially little outlay on apparatus and logistics. For this purpose, according to the invention, a flow-routing body with an advance guide blade that is connected upstream of the vane blade as seen in the direction of flow of the working medium of the gas turbine is joined to the vane base body.

7 Claims, 2 Drawing Sheets

GAS TURBINE WITH A GUIDE VANE

CROSS REFERENCE TO RELATED APPLICATIONS

This application claims the benefits of European application No. 07001073.1 filed Jan. 18, 2007, and is incorporated by reference herein in its entirety.

FIELD OF INVENTION

The invention relates to a gas turbine as described in the claims.

BACKGROUND OF THE INVENTION

Gas turbines are used in many areas to drive generators. Here, the energy content of a fuel is utilized to generate a rotary movement of a turbine shaft. For this purpose, the fuel is burnt in a number of burners, with compressed air being supplied by an air compressor. The combustion of the fuel generates a working medium that is at a high pressure and a high temperature. This working medium is passed into a turbine unit connected downstream of the burner, where it is expanded in a work-performing manner.

To transfer the momentum of the working medium to the turbine shaft, the turbine unit of a gas turbine has a number of rotatable rotor blades connected to the turbine shaft. For this purpose, the rotor blades are arranged in the form of a ring on the turbine shaft and therefore form a number of rotor blade rings or rotor blade rows. The turbine and the compressor are arranged on a common turbine shaft, also referred to as the turbine rotor, to which the generator is connected and which is mounted such that it can rotate about its center axis.

To route the flow of the working medium and to ensure the highest possible efficiency during the transfer of momentum to the rotor blades, the turbine unit usually also comprises a number of stationary guide vanes. These are attached to an inner housing or the stator of the turbine, likewise in the form of a ring, so as to form guide vane rings or guide vane rows. The rotor blades serve to drive the turbine shaft by transferring momentum from the working medium flowing through the turbine. By contrast, the guide vanes serve to route the flow of the working medium between in each case two rotor blade rows or rotor blade rings following one another as seen in the direction of flow of the working medium. A successive pair made of a ring of guide vanes or a guide vane row and a ring of rotor blades or a rotor blade row is also referred to in this context as a turbine stage.

A guide vane generally has a platform, also referred to as a vane root, which is arranged as a wall element for fixing the guide vane in question to the inner housing of the turbine and forms the outer boundary of a hot-gas duct for the working medium flowing through the turbine. For efficient routing of the flow of the working medium in the direction of a rotor blade row which follows a guide vane row, the guide vane usually also has a profiled vane blade formed integrally on the vane root. The vane blade extends between the vane root, on one side, and a cover plate formed integrally on the vane blade on the other side; this cover plate or shroud delimits the hot-gas duct for the working medium in the direction toward the turbine shaft in the region of the respective guide vane row. The vane blade and the vane root formed integrally thereon together with the cover plate likewise formed integrally thereon form a vane base body of the corresponding guide vane, which is usually of single-piece design. A vane base body of this type can be produced, for example, by casting, if appropriate also in single-crystal form.

In terms of specific design, i.e. in particular in terms of the selection of a suitable geometry, suitable dimensions and/or a suitable material, to ensure the highest possible efficiency of flow routing and transmission of momentum, it is desirable for guide vanes of this type to be specifically matched to the particular conditions and restricting factors at their location of use. Particularly in the case of gas turbines with combustion chamber systems that have a plurality of tubular combustion chambers arranged circumferentially distributed around the turbine shaft, this can lead to local fluctuations, differences and inhomogeneities in terms of the prevailing specific flow and temperature conditions in the circumferential direction around the turbine shaft. Therefore, in particular for the guide vanes belonging to what is described as the first guide vane row i.e. the guide vane row arranged between the combustion chamber and the first rotor blade row, as seen in the direction of flow of the hot gas, the incident flow onto and thermal stressing of the guide vane in question are relatively highly dependent on the precise installation position of the guide vane within the guide vane row.

To take account of these different conditions of use of the guide vane yet nevertheless to ensure a particularly high efficiency and high operational reliability for the gas turbine, it is customary, when designing the guide vanes, in particular with a view to a suitable selection of materials, to work on the basis of the most highly stressed guide vane in the particular guide vane row, so that the guide vanes which are exposed to less stress are usually designed with very high safety margins.

Alternatively, in gas turbines of this type, it is also possible to use systems in which individually adapted guide vanes are used in order to reduce the additional design and apparatus outlay associated with maintaining excessive safety margins. In systems of this type, guide vanes that are individually matched to the particular installation position are provided, but this requires increased numbers of spare parts to be kept in stock and, in particular for repair purposes, requires specific special manufacture of guide vanes that are matched to individual boundary conditions. Therefore, systems of this type can likewise only be achieved with high levels of technical and apparatus outlay.

SUMMARY OF INVENTION

The invention is therefore based on the object of providing a gas turbine of the abovementioned type which can achieve an improved efficiency with a particularly low outlay on apparatus and logistics.

With regard to the gas turbine, this object is achieved, according to the invention, by virtue of the fact that at least two guide vanes of the guide vane ring have flow-routing bodies with different advance guide blades.

The invention is based on the consideration that in a gas turbine having a plurality of combustion chambers, according to the invention it is possible to particularly effectively homogenize the flow profile in the inflow-side region of the annular duct of the turbine. To particularly effectively counteract the inhomogeneities which occur in the flow profile by making use of the additional degrees of freedom which can be achieved by adding the advance guide blades, at least two of the guide vanes have flow-routing bodies with different advance guide blades. As a result, the individual hot-gas streams from each combustion chamber, on passing into the annular duct of the turbine, can be diverted particularly efficiently in accordance with their local flow conditions by the locally adapted flow-routing bodies. Previous flow nonconformities onto individual guide vanes in the ring are now avoided. The efficient diversion results in an overall reduction in the aerodynamic losses in the hot gas. This reduction leads to an improved gas turbine efficiency.

To ensure a particularly low outlay on apparatus and logistics, the guide vane should in principle have a standardized base component which can be used for all installation positions and in particular for retrofit and repair applications can be used for any desired installation positions within the particular guide vane row. For this purpose, the guide vane in question is provided with the vane base body, which is of single-piece design and comprises the vane root, the cover plate and the profiled vane blade extending between them. In order, nevertheless, to be able to ensure the local inflow and hot-gas conditions are individually adapted to when using standardized, uniform components of this type, in addition to this vane base body in the style of an advance guide vane the advance guide blade is provided, the geometry of which should in particular be suitably adapted to the prevailing local flow conditions.

In this way, by suitably selecting the geometry of the advance guide blade, it is possible to take account of different inflow conditions upstream of the entry edge of the actual vane blade, in which context it is possible to compensate for or at least reduce the abovementioned differences. For particularly simple assembly and therefore outlay to be kept at a low cost, the advance guide blade should in particular be of modular design, so that by joining the advance guide blade to the vane base body it is possible, in a relatively simple way, to provide the guide vane that is ultimately intended for installation.

In particular the modular design, on account of the combination of the vane base body with the advance guide blade provided as an additional module, by suitable combination of these components, allows a particularly high degree of flexibility to be achieved in adapting the guide vane to individual conditions using a particularly high level of standardized components. To make particularly efficient and advantageous use of this flexibility, it is preferable for the flow-routing body to be made from a material that is more thermally stable than the vane base body. It is thus possible in particular to take account of the fact that especially in the first guide vane row the flow-routing body is the most thermally stressed component, which is directly exposed to the hot gas flowing out of the combustion chambers. In particular the flow-routing body may be made from a ceramic material.

In particular with a view to making repair or maintenance work especially simple, the flow-routing body should be designed for particularly simple assembly on the vane base body. This can be achieved in particular by the flow-routing body advantageously being inserted between the vane root and the cover plate of the vane base body. In a further advantageous configuration, the flow-routing body can then, at the end sides, be cohesively, non-positively and/or positively connected, in particular by welding or soldering, to the vane root and to the cover plate of the vane base body.

The provision of the associated flow-routing body for the vane base body is a preferred option for a guide vane belonging to the first guide vane row.

The advantages achieved by the invention consist in particular in the fact that, as a result of the vane base body being combined with an associated flow-routing body, it is possible, largely using standardized components and in a particularly simple way, to produce guide vanes that are individually and specifically matched to locally varying conditions of use.

Even with a vane base body that is of standardized design, by suitably selecting geometry and positioning of the flow-routing body in relation to the vane base body, it is possible to compensate for or reduce local differences in flow routing and incoming flow onto the individual guide vanes as a result of the positioning in the particular guide vane row, so that the entry profile for the turbine rotor blade row that follows the guide vane row becomes aerodynamically more homogenous. It is in this way possible, inter alia, to reduce the excitation of oscillations in the rotor blade region. Such use of add-on parts to adapt a standard guide vane to different conditions of use can in particular replace the production and holding in stock of different, geometrically similar components, namely a large number of complete guide vanes that are individually adapted to the particular conditions of use.

Furthermore, the flow-routing body may also be designed and dimensioned in the form of a desired breaking point so in the event of wear or overload phenomena it is likely that the flow-routing body will fail or become damaged before any such damage occurs at the actual vane body. This significantly facilitates maintenance and repair work, since in the event of damage it is only necessary to replace the flow-routing body and not, for example, the entire guide vane.

BRIEF DESCRIPTION OF THE DRAWINGS

An exemplary embodiment of the invention is explained in more detail with reference to a drawing, in which.

DETAILED DESCRIPTION OF INVENTION

Figure 1:
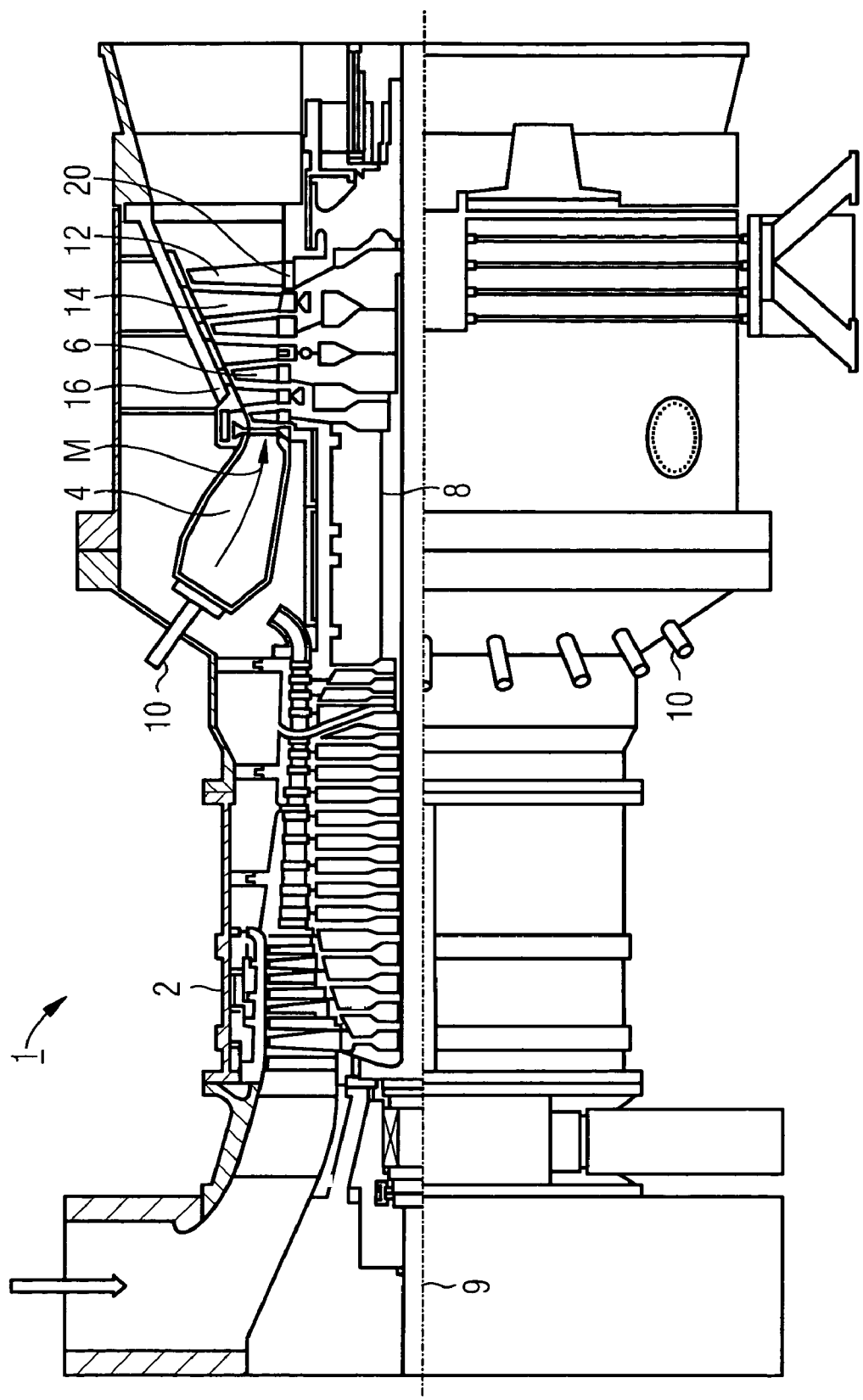
FIG. 1 shows a longitudinal section through a gas turbine.

The gas turbine 1 shown in FIG. 1 has a compressor 2 for combustion air, a combustion chamber 4 and a turbine 6 for driving the compressor 2 and a generator (not shown in more detail). For this purpose, the turbine 6 and the compressor 2 are arranged on a common turbine shaft 8, also referred to as the turbine rotor, to which the generator is also connected and which is mounted such that it can rotate about its center axis 9.

The combustion chamber arrangement 4 comprises a number of individual, tubular combustion chambers, which are arranged in the form of a ring around the turbine shaft 8 and each of which is equipped with in each case one burner 10 for burning a liquid or gaseous fuel. The combustion chambers are provided on their inner wall with heat shield elements (not shown in more detail). As an alternative to the combustion chambers arranged in the form of a ring, it is also possible for there to be two combustion chambers in the style of vertical or horizontal silo combustion chambers, the outflow openings of which run out into the annular duct.

The turbine 6 has a number of rotatable rotor blades 12 connected to the turbine shaft 8. The rotor blades 12 are arranged in the form of a ring on the turbine shaft 8 and thereby form a number of rotor blade rows. Furthermore, the turbine 6 comprises a number of stationary guide vanes 14, which are attached to an inner housing 16 of the turbine 6, likewise in the form of a ring, so as to form guide vane rows. The rotor blades 12 are used to drive the turbine shaft 8 by transmitting momentum from the working medium M flowing through the turbine 6. By contrast, the guide vanes 14 are used to route the flow of the working medium M between in each case two rotor blade rows or rotor blade rings which follow one another, as seen in the direction of flow of the working medium M. A successive pair made up of a ring of guide vanes 14 or a guide vane row and a ring of rotor blades 12 or a rotor blade row is in this context also referred to as a turbine stage.

Each guide vane 14 has a vane root 18, also referred to as the platform, which is arranged as a wall element for fixing the guide vane 14 in question to the inner housing 16 of the turbine 6. The vane root 18 is a relatively highly thermally stressed component which forms the outer boundary of a hot-gas duct for the working medium M flowing through the turbine 6. Each rotor blade 12 is, in a similar way, attached to the turbine shaft 8 via a platform 20, also referred to as a blade root.

Figure 2:
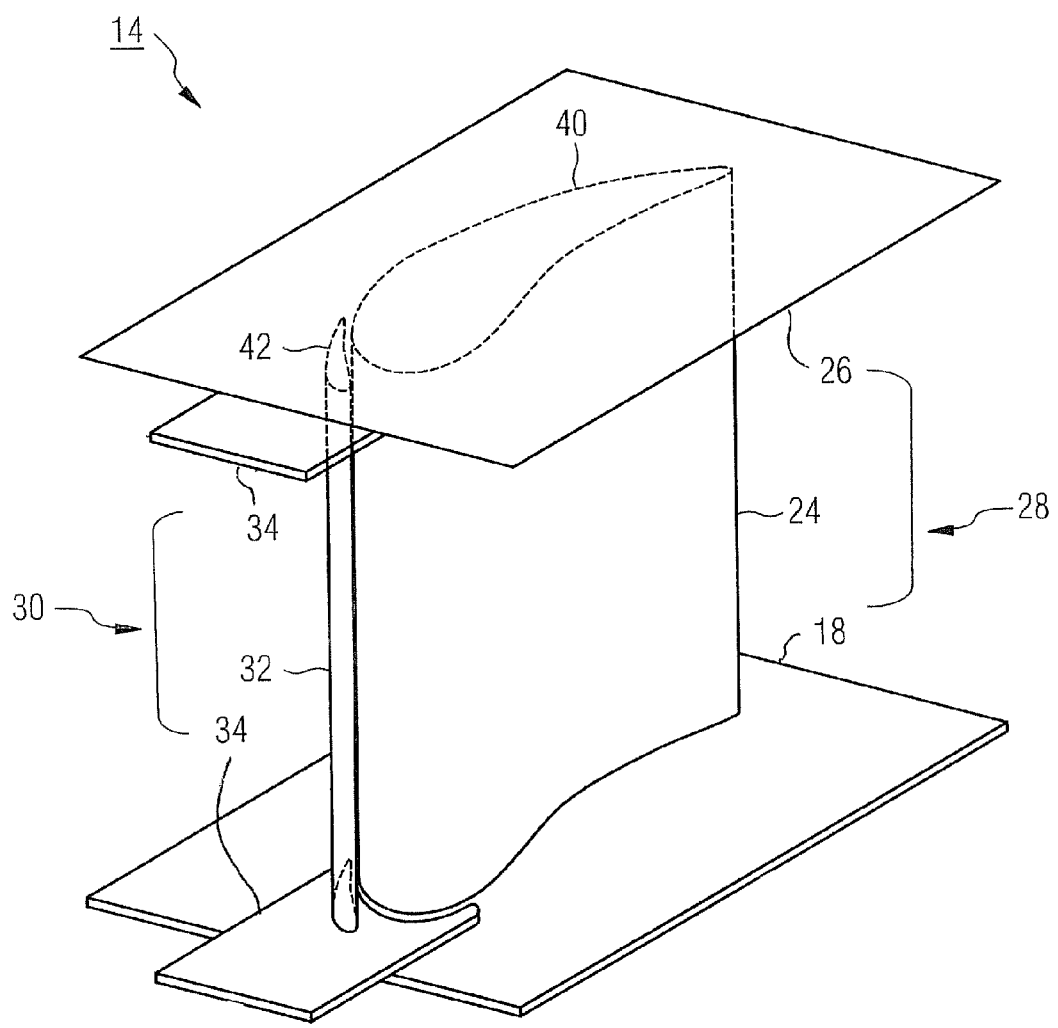
FIG. 2 shows a guide vane.
Identical parts are denoted by the same reference designations in both figures.

FIG. 2 shows a guide vane 14 from what is referred to as the first guide vane row, i.e. from the guide vane row arranged between the combustion chamber outlet and the first rotor blade row, as seen in the direction of flow of the hot gas. As can be seen from this figure, the guide vane 14 comprises a profiled vane blade 24 which is formed integrally on the vane root 18. The vane blade 24 extends between the vane root 18, on one side, and a cover plate 26, which is likewise formed integrally on the vane blade 24. Vane root 18, vane blade 24 and cover plate 26 are of single-piece design and together form a monolithic component, namely a vane base body 28 of the guide vane 14.

The guide vane 14 is specifically designed to allow more individual adaptation in terms of flow routing and thermal stressing to locally varying use conditions, as may occur in particular in the first guide vane row as a result of the particular relative position with respect to the closest tubular combustion chamber, while substantially using standardized components and in a relatively simple way. To allow this, the guide vane 14, in addition to the vane base body 28, also comprises a flow-routing body 30, which is joined to the vane base body and has an advance guide blade 32 connected upstream of the vane blade 24 as seen in the direction of flow of the working medium M. End plates 34, by means of which the flow-routing body 30 is inserted between the vane root 18 and the cover plate 26 of the vane base body 28, are formed integrally on the end sides of the advance guide blade 32. For final assembly of the two components vane base body 28 and flow-routing body 30, the flow-routing body 30, at the end sides, is cohesively, non-positively and/or positively connected, in particular by welding or soldering, to the vane root 18 and the cover plate 26 of the vane base body 28.

The illustrations indicated by dashed lines in the cover plate 26 in FIG. 2 approximately represent the contours of the components below. As can be seen from this illustration, the vane blade 24 has a profiling or contouring which is suitably selected for routing the flow of the working medium and is reflected in the contour 40. Similarly, the advance guide blade 32 of the flow-routing body 30 is also suitably contoured for flow routing and has a contour 42. By combining the components vane base body 28, on the one hand, and flow-routing body, 30, on the other hand, therefore, it is possible to individually adapt the guide vane 14 to locally differing flow conditions or boundary conditions by suitably selecting the associated flow-routing body 30 while using a substantially standardized vane base body 28. It is thus possible, by suitably selecting the geometry, dimensions and/or material of the flow-routing body 30, even when using standardized vane base bodies 28 to adapt the guide vane 14 in a particularly simple way to locally differing conditions in terms of the flow profile or hot-gas stressing produced by the working medium M.

The gas turbine 1 may in particular also have a plurality of individual combustion chambers, in particular tubular combustion chambers. In order to effectively counteract resulting, even stronger inhomogeneities in flow profile along the circumference of the turbine inlet, in such a situation the flow-routing bodies 30 of at least two guide vanes 14 are provided with different advance guide blades 32.

The invention claimed is:

1. A gas turbine comprising:
a plurality of combustion chambers; and
a turbine having:
a plurality of guide vanes arranged in a ring and each of the guide vanes having a vane base body where the vane base body comprises:
a vane root,
a cover plate, and
a profiled vane blade extending between the cover plate and vane root,
wherein a flow-routing body is joined to each vane base body, the flow routing body including an advance guide blade connected upstream of the profiled vane blade as seen in the direction of flow of the working medium of the gas turbine,
wherein at least two of the guide vanes arranged in the ring have flow-routing bodies with different geometries of the advance guide blades included therein.

2. The gas turbine as claimed in claim 1, wherein the flow-routing body is made from a material having at least one property that is more stable with variation in temperature than the vane base body, within a range of operating temperature of the gas turbine.

3. The gas turbine as claimed in claim 2, wherein the flow-routing body is inserted between the vane root and the cover plate of the vane base body.

4. The gas turbine as claimed in claim 3, wherein the flow-routing body at the end sides is connected to the vane root and the cover plate of the vane base body.

5. The gas turbine as claimed in claim 4, wherein the flow-routing body at the end sides is connected to the vane root and the cover plate of the vane base body by welding or soldering.

6. The gas turbine as claimed in claim 5, wherein the vane base body of each guide vane is a single-piece.

7. The gas turbine as claimed in claim 6, wherein the guide vane ring is arranged immediately downstream of the combustion chambers.

* * * * *